United States Patent
Asai et al.

(10) Patent No.: US 6,715,922 B2
(45) Date of Patent: Apr. 6, 2004

(54) ROLLING BEARING WITH SEALING DEVICE

(75) Inventors: Hiromitsu Asai, Kanagawa (JP); Toshimi Takajo, Kanagawa (JP); Takahiko Uchiyama, Kanagawa (JP); Takashi Ogawa, Kanagawa (JP); Yoshinori Tanaka, Kanagawa (JP)

(73) Assignee: NSK Ltd., Tokyo (JP)

(*) Notice: Subject to any disclaimer, the term of this patent is extended or adjusted under 35 U.S.C. 154(b) by 44 days.

(21) Appl. No.: 09/988,040

(22) Filed: Nov. 16, 2001

(65) Prior Publication Data

US 2002/0097934 A1 Jul. 25, 2002

(30) Foreign Application Priority Data

Nov. 16, 2000 (JP) .................... P. 2000-349669

(51) Int. Cl.[7] .............................................. F16C 33/78
(52) U.S. Cl. ........................................ 384/482; 384/484
(58) Field of Search ................... 384/484, 485, 384/480, 488, 482

(56) References Cited

U.S. PATENT DOCUMENTS 3,642,335 A * 2/1972 Takahashi et al. .......... 384/482
4,588,312 A * 5/1986 Dickinson et al. .......... 384/482
4,772,138 A * 9/1988 Dreschmann et al. ....... 384/488
5,037,213 A * 8/1991 Uchida et al. .............. 384/482
5,472,284 A * 12/1995 Alling et al. ............... 384/484

FOREIGN PATENT DOCUMENTS

| JP | 4-87022 | 7/1992 |
| JP | 5-96549 | 12/1993 |
| JP | 6-35662 | 5/1994 |
| JP | 6-313436 | 11/1994 |

* cited by examiner

Primary Examiner—Matthew C. Graham
(74) Attorney, Agent, or Firm—Sughrue Mion, PLLC

(57) ABSTRACT

A rolling bearing with the sealing device which has a fitting groove and sealing device with a mounting portion. The fitting groove formed on the inner peripheral surface of an outer ring. An outside surface of the fitting groove tilts at 5 to 30 degrees with respect to an radial direction of the bearing. An inside surface of the fitting groove tilts at a tilt angle smaller than that of the outside surface. A total of these tilt angles is 35 degrees or more. The mounting portion has a base portion contacting the inside surface and a portion projecting toward the outside surface of the fitting groove from the base portion, and the mounting portion is thinnest at a front end portion of the projecting portion.

14 Claims, 4 Drawing Sheets

ROLLING BEARING WITH SEALING DEVICE

BACKGROUND OF THE INVENTION

The present invention relates to a rolling bearing with a sealing device, and more particularly to a rolling bearing with a sealing device having improved characteristics in a seal fitting groove of an outer ring and a mounting portion of the sealing device to be fitted in the seal fitting groove.

With respect to conventional rolling bearings, a lubricant such as a grease or a lubricating oil is applied on raceway surfaces of an inner ring and an outer ring and rolling surfaces of rolling elements such as balls or rollers, for maintaining lubricity for a long period of time. The conventional rolling bearings include a rolling bearing with a sealing device that prevents the lubricant in a space defined by in the raceway surfaces and rolling surfaces from leaking and avoiding adhesion of dusts to these surfaces.

FIG. 5 shows one example of the rolling bearing with the sealing device. FIG. 5 shows cross sectional view of elemental portions of a single-row deep groove ball bearing with a sealing device 50 (called as "ball bearing" hereafter). As shown in FIG. 5, the ball bearing 50 has a plurality of rolling elements 54 that are rotatably held by a retainer 53 and equidistantly arranged between an inner ring 51 and an outer ring 52 in a peripheral direction of the ball bearing 50.

The inner ring 51 has a protruding portion 55 at a central portion of an outer peripheral surface thereof, that is spaced from both end portions of the outer peripheral surface in an axial direction thereof. The protruding portion 55 protrudes toward the outer ring 52 from the outer peripheral surface of the inner ring 51. An inner raceway 51a is formed into a concave shape for receiving the rolling elements 54 at the outer peripheral surface (an upper surface in the drawing) of the protruding portion 55.

The outer ring 52 has a protruding portion 56 at a central portion of an inner peripheral surface thereof, that is spaced from both end portions of the inner peripheral surface in an axial direction thereof. The protruding portion 56 protrudes toward the inner ring 51 from the inner peripheral surface of the outer ring 52. An outer raceway 52a is formed into a concave shape for receiving the rolling elements 54 at the inner peripheral surface (a lower surface in the drawing) of the protruding portion 56. Further, at the inner peripheral surface which is adjacent a side surface 52b of the protruding portion 56, a fitting groove 57 is formed to be hollowed from the both end portion of the inner peripheral surface of the outer ring 52 to outside of the ball bearing 50 in a radius direction of the outer ring 52.

An annular sealing device 70 is substantially composed of a mounting portion 71 arranged at a outer edge portion of the sealing device 70, a lip portion 72 arranged at an inner edge portion of the sealing device 70 and a connecting portion 73 connecting the mounting portion 71 with the lip portion 72. The mounting portion 71 of the sealing device 70 is fitted into the fitting groove 57 of the outer ring 52. Then the lip portion 72 of the searing device 70 is set on a side surface 51b of the protruding portion 55 of the inner ring 51, so that the sealing device 70 is attached to the side surface of the ball bearing 50 in such manner of being secured to the outer ring 52. The sealing device 70 may be secured to either of the inner ring or the outer ring. Generally the sealing device is secured to the outer ring.

As a material composing the sealing device 70, a metal which forms the whole sealing device 70 are known, or others composed of a connecting portion formed with a metal ring, and a mounting portion and a lip portion formed with a soft rubber is also known. A sealing device formed with plastic or elastomer is also known (called as "plastic sealing device" hereafter). For example, Japanese Patent Unexamined Publication No. Hei.6-313436 teaches a plastic sealing device which uses a comparatively hard synthetic-plastic-polymer at a connecting portion and a comparatively soft elastic-synthetic-plastic at a mounting portion and a lip portion, and unifies both of the plastic as one body by insert molding. In Japanese Utility Model Laid-Open No. Hei. 5-96549, another plastic sealing device which is formed by changing kinds of resins for heightening rigidity of a connecting portion and increasing flexibility of a lip portion than that of a mounting portion is described.

A plastic sealing device which is formed with a plastic simplex and has variously designing shapes of a mounting portion is also known. For example, Japanese Utility Model Laid-Open No. Hei. 4-87022 discloses, a plastic sealing device having, at an outside surface of an outer peripheral edge portion, a thin triangular shaped annular protruding portion in cross section. The annular protruding portion almost rectangular contacts with an outside surface of a fitting groove in a bending state. Further, in Japanese Utility Model Laid-Open No. Hei. 6-35662 discloses a plastic sealing device having a trapezoidal shaped protruding portions in cross section and a thin and annular protruding portion is described. An inside surface of an outer peripheral edge portion of the trapezoidal shaped protruding portion contacts an inside surface of a fitting groove of the outer peripheral edge portion. The thin and annular protruding portion contacts with an outside surface of the fitting groove in a bending condition. The trapezoidal shaped protruding portions and the thin and annular protruding portion are divided into a plurality pieces equidistantly following a peripheral edge.

In addition, as the kinds of plastics, engineering-plastic-simplex, or plastic composite materials comprising short fiber of glass fiber and carbon fiber which are mixed to be strengthened is used.

As mentioned above, since the mounting portion of the plastic sealing device is pushed into the fitting groove of the outer ring under the elastically deformed condition, a creep deformation may be caused due to atmospheric temperature or heating with rotation of the rolling bearing. Accordingly, there is a possibility that fixing force of the mounting portion into the fitting groove is reduced.

As coefficient of linear expansion of plastic is larger than that of metal, when the temperature rises, the mounting portion expands in a radial direction of the rolling bearing. Then since the amount of elastic deformation (tightening force) becomes larger than an amount of that at room temperatures, the creep deformation is easier to occur.

When an atmospheric temperature is higher than 80° C., the plastic sealing device causes the creep deformation in almost all cases, then when the atmosphere temperature turns back to the room temperatures, a gap is possibly formed between the fitting groove of the outer ring and the mounting portion of the plastic sealing device. In addition, at that time, the fixing force becomes weak, then play or backlash may be occurred. When the fixing force into the fitting groove is reduced, slipping may be occurred between the outer ring and the plastic sealing device, so that a sealing efficiency of the plastic sealing device is lowered.

If thickness of the mounting portion is made large for heightening rigidity of the plastic sealing device, there is also such a problem that when the plastic sealing device expands in the radial direction, the expanded portion cannot be absorbed with only deformation of the mounting portion, so that the plastic sealing device itself curves outward from the side of the rolling bearing and a portion of the curve projects from the rolling bearing. In an ultra miniaturized rolling bearing having an outer radial of the outer ring being around several mm, a problem is to decrease circularity.

Rolling bearings are often served at atmospheric temperatures of 80 to 120° C., the plastic sealing device cannot fully cope with services for a long period of time, because the plastic sealing device is easy to cause the creep deformation at the atmospheric temperatures regardless of changes of measures such as the above engineering-plastic-simplex, or composite materials comprising short fiber of glass fiber and carbon fiber which are mixed to be strengthened, and only plastic sealing device varying (devising) shapes of the mounting portion.

SUMMARY OF THE INVENTION

The present invention has been established in view of these circumstances, and an object of the invention is to offer a rolling bearing with a sealing device which can be used at high atmospheric temperatures, prevents the mounting portion of the sealing device from creep deformation, and maintains the sealing efficiency for a long time.

The object of the invention is accomplished by a rolling bearing with a sealing device which includes an inner ring, an outer ring having a fitting groove formed as a concave shape portion that comprises an outside surface, an inside surface and a bottom face at vicinity of an edge portion of the inner peripheral surface of the outer ring in an axial direction of the rolling bearing, wherein the fitting groove becomes narrower, in cross section, as going to an outside in a radius direction of the rolling bearing, the outside surface is formed at edge side of the inner peripheral surface of the outer ring and tilts at a tilt angle of 5 to 30 degrees with respect to the radial direction of the rolling bearing, the inside surface is formed on opposite side to the outside surface and tilts at a tilt angle with respect to the radial direction smaller than the tilt angle of the inside surface, the bottom face connects the outside surface and the inside surface and a total of these tilt angles of the outside surface and the inside surface is 35 degrees or more, a plurality of rolling elements rotatably arranged between the inner ring and the outer ring, and an annular sealing device arranged at a side of the rolling bearing and having a mounting portion that is fitted within the fitting groove and formed at an outer peripheral edge portion of the annular sealing device, wherein the mounting portion of the sealing device has a base portion contacting the inside surface of the fitting groove and a projecting portion protruding toward the outside surface of the fitting groove from the base portion, the projecting portion reduces thickness in such a manner that a front end portion of the projecting portion becomes the thinnest in the projecting portion.

Herein, the front end portion of the projecting portion is meant by a front end portion of the projecting portion contacting the outside surface of the fitting groove.

According to the above rolling bearing with the sealing device of such a structure, even if the rolling bearing is used at a high temperature and the sealing device is expanded, since a tilt angle of the outside surface and inside surface of the fitting groove of the outer ring is small as 5 to 30 degrees in the radial direction of the rolling bearing, a distortion of the projecting portion of the sealing device (called as "exposed thread" hereafter) is restrained to be a little increase. Therefore, when the atmosphere temperature turns back to the room temperature, the front end portion of the projecting portion suppresses deterioration with the fitting condition in the fitting groove owing to stress relaxation in the mounting portion of the sealing device.

Even if the atmosphere temperature turns back to the room temperature after the mounting portion is creep-deformed by somewhat stress relaxation, and the expansion of the sealing device in the radial direction is settled down. Since the tilt angle of the fitting groove is small and a dimensional change in the width direction is small with respect to a dimensional change in the radial direction, the exposed thread can be maintained and the sealing efficiency can be kept preferable without generating a gap between the mounting portion and the fitting groove.

Besides, since the projecting portion of the sealing device becomes thinner toward the outside surface of the fitting groove and the front end portion of the projecting portion contacting the outside surface becomes a thinner than another portion of the projecting portion, even if the sealing device expands in the radial direction, the outer peripheral edge portion of the sealing device can escape into an inner portion of the fitting groove at low force. Then, owing to the coefficient of linear expansion of plastic larger than that of metal, even if the sealing device expands in the radial direction and the exposed thread is made larger than that of state at the room temperature, the sealing device does not project from the side of the bearing because a remaining power does not load on the other portions of the sealing device.

In an embodiment of the present invention, it is preferable that the inner ring has a sealing groove formed into a concave shape in an axial direction, the sealing groove comprises a bottom face connecting a inside surface and a outside surface at vicinity of a edge portion of the inner peripheral surface of the outer ring, and the inside surface opposites to the outside surface; and the sealing device has a lip portion formed on an inner peripheral edge portion of the sealing device and contacts two portions that are the inside surface of the sealing groove and a vicinity of a central portion of the outer peripheral surface of the inner ring more inside than the sealing groove, to thereby form a labyrinth.

With this construction, in the rolling bearing with the sealing device, the lip portion of the sealing device contacts the two pats which are the sealing groove defined in the inner ring and the central portion of the outer peripheral surface of the inner ring, so that the sealing efficiency of the sealing device of the inner ring side is improved.

DETAILED DESCRIPTION OF THE PREFERRED EMBODIMENT

Explanation will be made to modes for carrying out the invention, referring to the attached drawings. In the modes as will be explained, as to members having equivalent structures and work to the members having already been explained, the same or corresponding signs will be given to simplify or omit explanations therefor.

Figure 1:
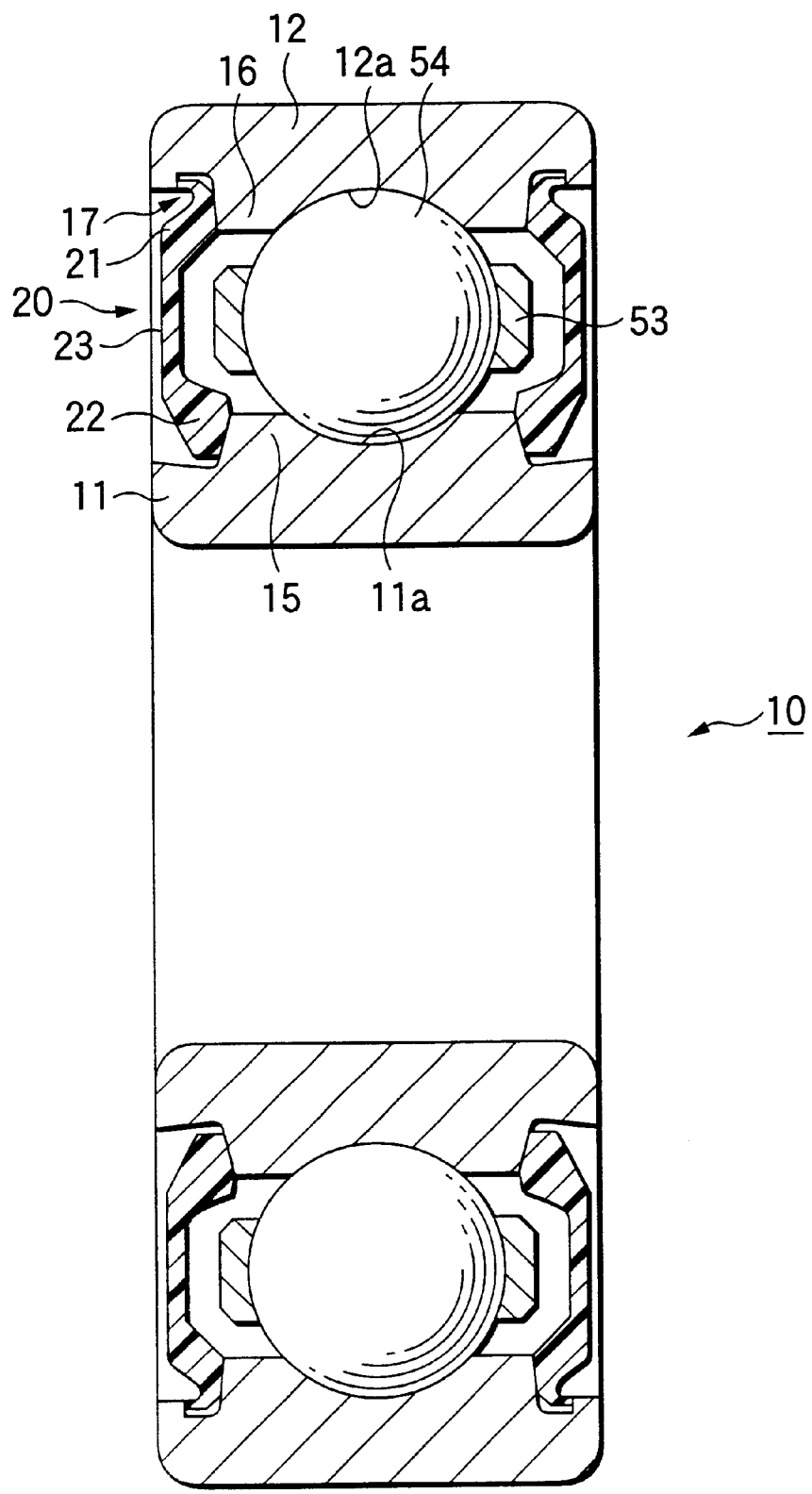
FIG. 1 is a cross sectional view of the ball bearing 10 of the first embodiment according to the invention.
Figure 2:
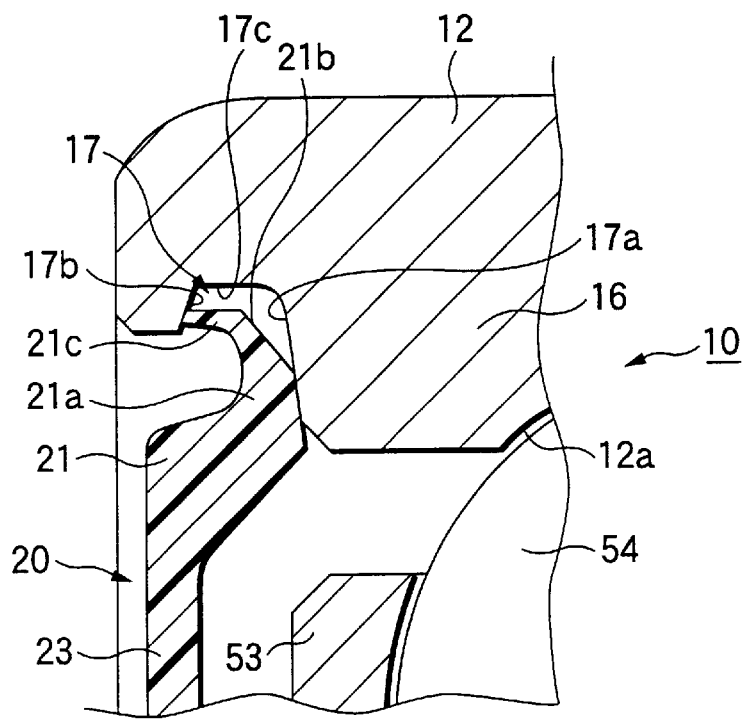
FIG. 2 is a cross sectional view of the elementary portions of the first embodiment according to the invention, when the mounting portion 21 of the sealing device 20 is fitted in the fitting groove 17 of the ball bearing 10 shown in FIG. 1.
Figure 3:
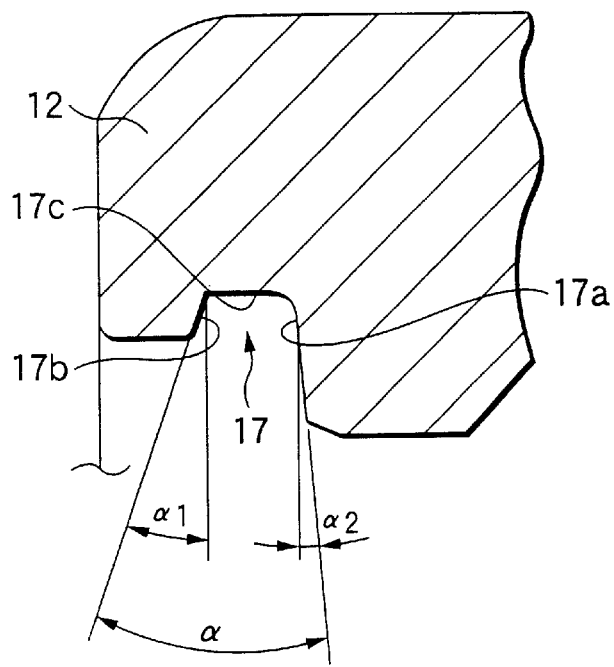
FIG. 3 is an enlarged cross sectional view of the fitting groove of the ball bearing 10 shown in FIG. 1.

FIG. 1 shows a cross sectional view of a single-row deep groove ball bearing with a sealing device 10 (called as "ball bearing 10" hereafter) of a first embodiment of the invention. FIG. 2 is cross sectional views of elementary portions of the ball bearing 10 shown in FIG. 1. FIG. 3 is an enlarged cross sectional view of the fitting groove of the ball bearing 10 shown in FIG. 1.

As shown in FIG. 1, the ball bearing 10 has a plurality of rolling elements 54 that is held by a retainer 53 between the inner ring 11 and the outer ring 12 rotatably, and arranged equidistantly following the peripheral direction of the ball bearing 10.

The inner ring 11 has a protruding portion 15 protruded toward the outer ring 12 at a central portion spaced from both end portions in an axial direction of the outer peripheral surface of the inner ring 11. A raceway 11a is formed into concave shape for receiving the rolling elements 54 at the outer peripheral surface of the protruding portion 15.

The outer ring 12 has a protruding portion 16 protruded toward the inner ring 11 at a central portion spaced from both end portions in an axial direction of the inner peripheral surface of the outer ring. A raceway 12a is formed into a concave shape for receiving the rolling elements 54 in the inner peripheral surface of the protruding portion 16. Further, a fitting groove 17 is defined at a side surface of the protruding portion 16.

A sealing device 20 is shaped annularly by integral moulding an engineer plastic having excellent in heat resistance, necessary rigidity and appropriate elasticity requested to fittingly insert into the fitting groove 17. The sealing device 20 has a mounting portion 21 at an outer peripheral edge portion thereof, a lip portion 22 at an inner peripheral edge portion, and a connecting portion 23 connects the mounting portion 21 with the lip portion 22. The sealing device 20 is attached at the side of the ball bearing 10 in the condition of being fixed to the outer ring 12, where the mounting portion 21 is fitted into the fitting groove 17 of the outer ring 12 and the lip portion 22 is mounted on the protruding portion 15 of the inner ring 11.

FIG. 2 shows the cross sectional view of the elementary portions for fitting the mounting portion 21 of the sealing device 20 into the fitting groove 17 of the ball bearing 10.

The fitting groove 17 is formed in the side of the inner peripheral surface of the outer ring 12 and adjacent to the side of the protruding portion 16 while spacing a predetermined space from the side of the outer ring 12 in an axial direction. In addition, the fitting groove 17 is substantially trapezoidal in cross section. The trapezoid shaped fitting groove 17 composes of an inside surface 17a forming a side portion of the protruding portion 16, an outside surface 17b opposite to the inside surface 17a and a bottom face 17c connecting both. The trapezoid shaped fitting groove 17 is also a concave shape portion having an opening which is narrower as going from the side of the inner peripheral surface of the outer ring 12 toward the outside in the radius direction of the ball bearing 10.

FIG. 3 shows a cross sectional view of the elementary portion of the fitting groove 17 of the outer ring 12.

The fitting groove 17 is preferable in that a tilt angle $\alpha 1$ tilts 5 to 30 degrees with respect to the outside surface 17b in the radial direction (vertical directions of the drawing) of the ball bearing 10. In addition, a tilt angle $\alpha 2$ with respect to the inside surface 17a in the radial direction is smaller than the tilt angle $\alpha 1$ of the outside surface 17b, and a total tilt angle a defined of the outside surface 17b and the inside surface 17b is preferably 35 degrees or less. The present embodiment includes two kinds, one is that the tilt angle $\alpha 1$ of the outside surface 17b is 30 degree, the tilt angle $\alpha 2$ of the inside surface 17a is 5 degrees and the total a of the tilt angles is 35 degrees, the other is that $\alpha 1$ is 7 degrees, $\alpha 2$ is 3 degrees and a is 10 degrees.

Referring to FIG. 2, the mounting portion 21 of the sealing device 20 has a base portion 21a and a projecting portion 21c. The base portion 21a is formed almost trapezoidal shape, in cross section, at the inside surface of the outer peripheral edge portion (right side of the drawing) of the sealing device 20. The base portion 21a contacts the inside surface 17a of the fitting groove 17 and has an inserting oblique face 21b. The projecting portion 21c protrudes toward the outside surface 17b from the outer peripheral edge portion of the base portion 21a and contacts as bent to the outside surface 17b of the fitting groove 17 as being bent.

When the sealing device 20 is inserted into the ball bearing 10, the mounting portion 21 is inserted from the side (left side of the drawing) of the outer ring 12. With the elasticity of the sealing device 20, the mounting portion 21 is pushed into the fitting groove 17 so as to gets over the inner peripheral surface at the edge portion of the outer ring 12 and the mounting portion 21 enters the interior of the fitting groove 17. Thus, the sealing device 20 provides a closely fitting condition with the fitting groove 17, where the base 21a of the mounting portion 21 contacts with the inside surface 17a of the fitting groove 17, and the projecting portion 21c is, as being bent, contacted to the inside surface 17b so as to create the exposed thread.

Depending on such a structure of this embodiment, since the tilt angle $\alpha$ of the fitting groove 17 of the outer ring 12 is small and the front end of the projecting portion 21c of the outer peripheral edge portion of the sealing device 20 become thin, even if the ball bearing 10 is served at a high temperature to expand the sealing device 20, the mounting portion 21 escapes outside in the radius direction of the fitting groove 17 at low force, so that the sealing device 20 neither curves outward of the side of the ball bearing 10 nor projects outside from the side of the same.

Stress relaxation occurs a little in a plastic if it is exposed to high temperatures under a condition of giving the exposed thread, being varied by the exposed thread, sorts of resins, temperatures, times and others. However, even if the mounting portion 21 is creep-deformed owing to the stress relaxation somewhat, after returning to the room temperature (the temperature goes down) and the expansion in the radial direction is settled, since the tilt angle $\alpha$ of the fitting groove 17 has been small, a dimensional change in the width direction is small with respect to the dimensional change in the radial direction of the fitting groove 17 and the increasing of the exposed thread is suppressed low. Accordingly, the fitting condition of the mounting portion 21 with the fitting groove 17 is restrained from deterioration, the exposed thread is maintained, and the sealing efficiency is kept preferable without creating any gap between the mounting portion 21 and the fitting groove 17.

Figure 4:
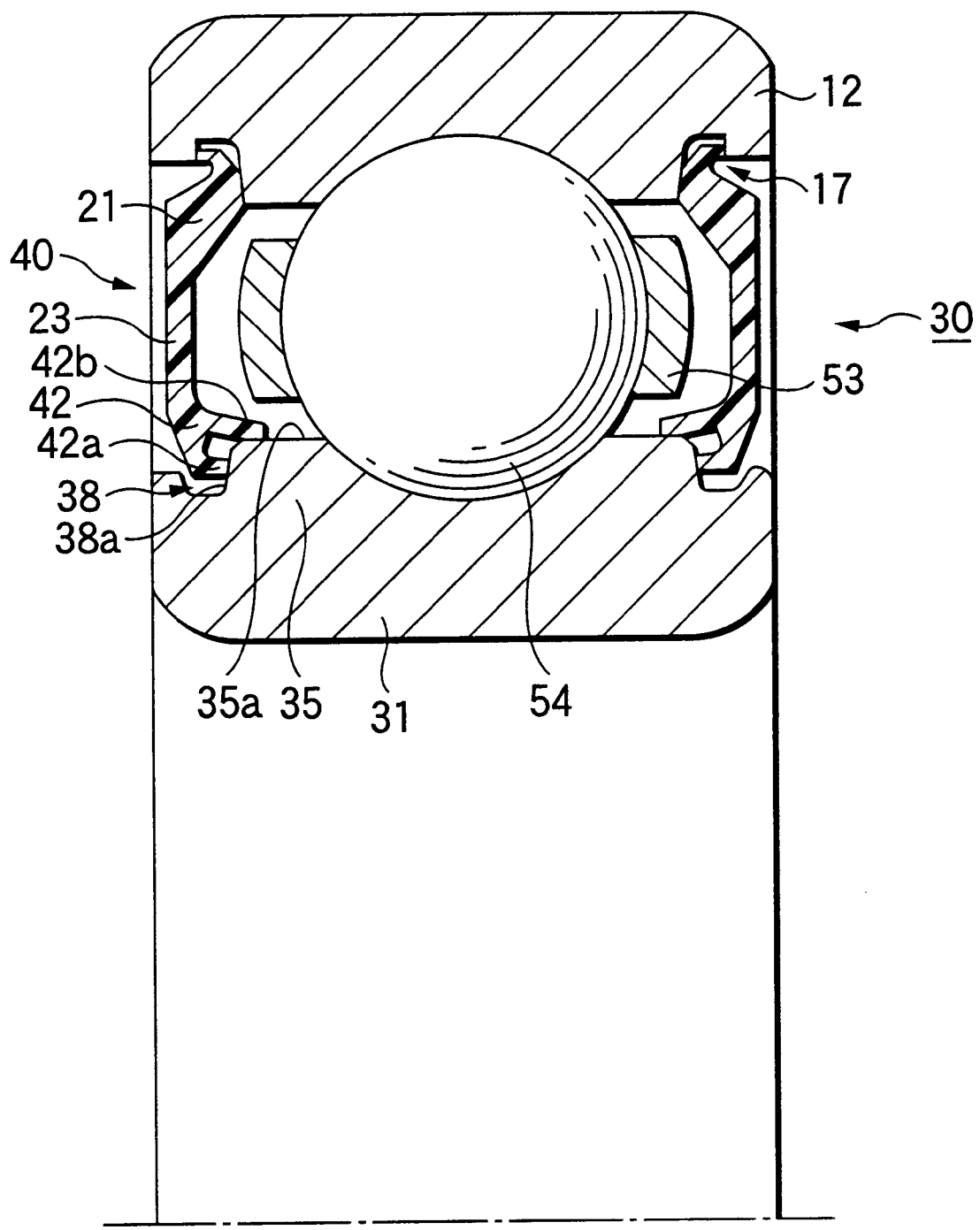
FIG. 4 is a portionially cross sectional view of a ball bearing 30 of a second embodiment according to the invention.
Figure 5:
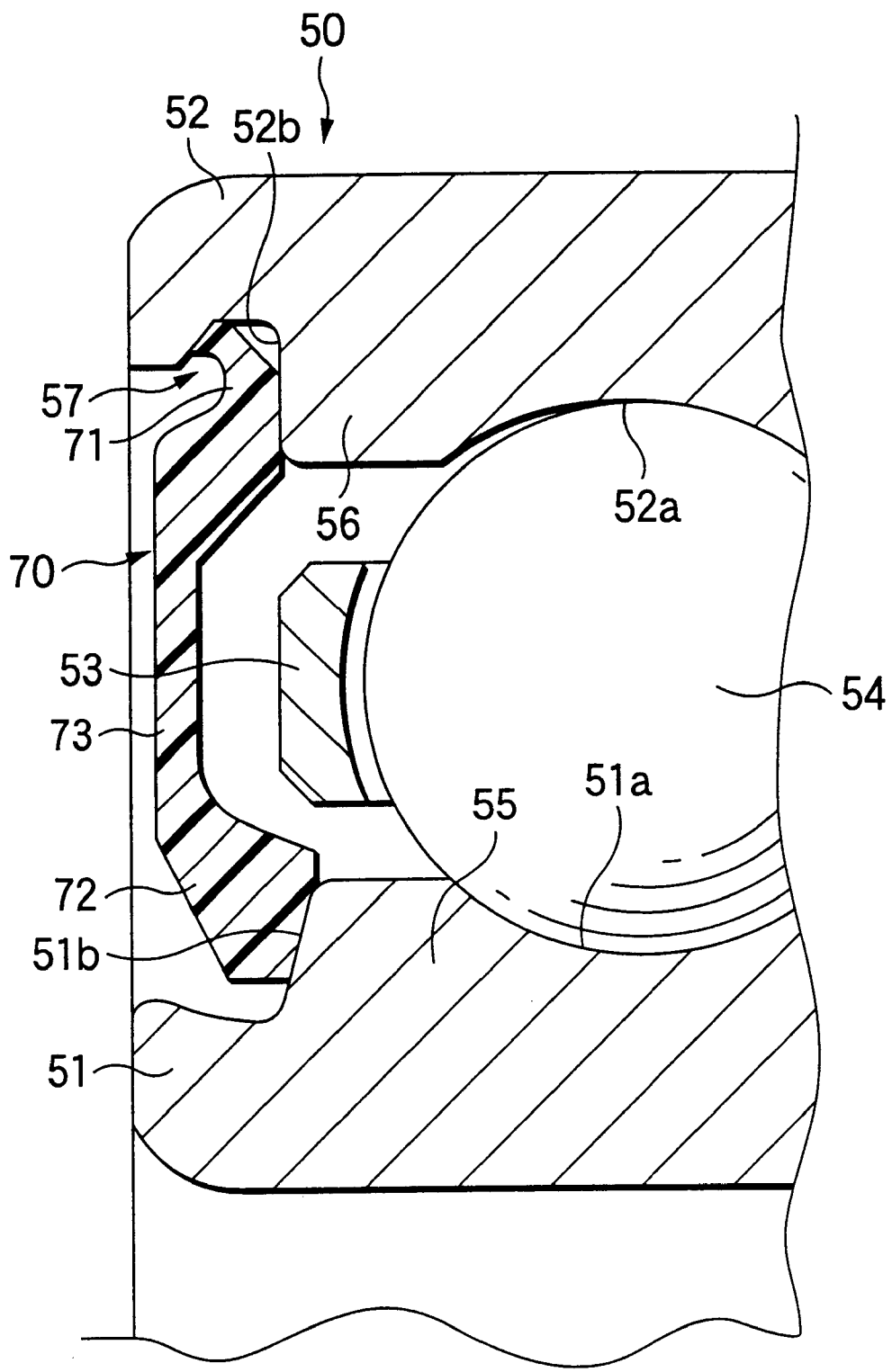
FIG. 5 is cross sectional view of the elementary portions showing the conventional ball bearing 50.

FIG. 4 shows a portionially cross sectional view of a ball bearing 30 of a second embodiment according to the invention.

The ball bearing 30 has a protruding portion 35 for receiving rolling elements 54 at a center portion of the outer peripheral surface of the inner ring 31. The protruding portion 35 protrudes toward the outer ring 12 from both edge portions holding the center portion. In addition, sealing grooves 38 are provided in both sides of the protruding portion 35 in the axial direction.

A lip portion 42 of the sealing device 40 to be used to the ball bearing 30 has sealing lips 42a, 42b at two locations of an inner peripheral edge portion of the inside surface of the sealing device 40 and a position spacing from this inner peripheral edge portion.

When the sealing device 40 is set in the ball bearing 30, the sealing lip 42a which is furnished on the inner peripheral edge portion of the lip portion 42 contacts the inside surface 38a of the sealing groove 38 composing one portion of a side surface of the protruding portion 35, while the sealing lip 42b contacts an inner peripheral surface 35a of the protruding portion 35 of the inner ring 31. The sealing lip 42b is furnished spacing from the sealing lip 42a and extended inside of the bearing from the sealing lip 42a.

According to the ball bearing 30 of such a structure, the lip portion 42 of the sealing device 40 contacts two portions that are an inside surface 38a of the sealing groove 38 provided in the inner ring 31 and an outer peripheral surface 35a of the protruding portion 35, whereby a labyrinth is formed. Accordingly, when the ball works, the sealing property of the lip portion 42 of the sealing device 40 is heightened, and a lubricant applied to raceway surfaces of the inner ring and outer ring does not leak outside of the ball bearing 30.

Incidentally, the present embodiment exemplifies the sealing device of a contacting type where the sealing lips contact the inner ring, and the invention may be also applied to the sealing device not contacting the inner ring.

Test results are shown between the conventional rolling bearing with the sealing device and the inventive rolling bearing with the sealing device.

It is known that stress generated in the fitting groove of the outer ring is expressed with a product of the exposed thread and elastic modulus of a material forming the sealing device. In the invention, the tilt angle of the fitting groove is reduced so as to restrain the exposed thread from increasing. As the sealing device of the test results, for a purpose of increasing stress and a purpose of controlling thermal expansion, plastics mixed with inorganic fibers were used.

As testing manners, the outer ring and the sealing device were used, the sealing device was inserted into the fitting groove of the outer ring, followed by charging in a high temperature chamber at 80° C. and 120° C. and taking out for a predetermined time, and rotation torque of the sealing device (rotating force of the plastic sealing device) was investigated. In the tests, the fitting groove of the outer ring shown in FIG. 3 was used.

The tilt angles of the tested fitting grooves are results evaluated as to two kinds of α=10 degrees (α1=7 degrees, α2=3 degrees) and α=35 degrees (α1=30 degrees, α2=5 degrees). If the tilt angle α1 in the outside surface of the fitting groove is less than 5 degrees, a force controlling in the radial direction was weak, and the sealing position (centering) was unstable and non-available.

The tilt angle in the fitting groove of the conventional example was results evaluated as to α=48 degrees (α1=45 degrees, α2=3 degrees).

Table 1 shows qualities of matters of the plastic sealing devices.

TABLE 1

(Raw materials for plastic seals)

| Experimental example | Qualities of sealing materials | Glass fiber (weight %) | Carbon fiber (weight %) |
|---|---|---|---|
| Ex. ex. 1 | Polyamide 66 | 40 | |
| Ex. ex. 2 | Polyamide 66 | 5 | |
| Ex. ex. 3 | Polyamide 66 | | 20 |
| Ex. ex. 4 | Polyamide 6 | 40 | |
| Ex. ex. 5 | Polybutylene terephthalate | 30 | |
| Ex. ex. 6 | Polyacetal | 30 | |
| Ex. ex. 7 | Polyacetal | 10 | |
| Ex. ex. 8 | Polyphenylene sulfide | | 30 |
| Ex. ex. 9 | Polyphenylene sulfide | 40 | |
| Ex. ex. 10 | Non-crystal polyarylate | 30 | |
| Ex. ex. 11 | Polyamide 46 | 30 | |
| Ex. ex. 12 | Polyamide 46 | 5 | |

Ex. ex.: Experimental example

Table 2 shows the tested results at 80° C.

The tested results in Table show that the rotation torque that ○ was ½ or more in the beginning period, Δ was ⅓ or more, and × was almost no rotation torque or the ball bearing was impossible to use.

TABLE 2

(Test results at 80° C.)

| Experimental example | Prior examples (α = 48°) | | | Inventive examples (α = 10°, α = 35°) | | |
|---|---|---|---|---|---|---|
| | 100 hrs | 300 hrs | 500 hrs | 100 hrs | 300 hrs | 500 hrs |
| Ex. ex. 1 | X | — | — | ○ | ○ | ○ |
| Ex. ex. 2 | X | — | — | ○ | ○ | Δ |
| Ex. ex. 3 | X | — | — | ○ | ○ | ○ |
| Ex. ex. 4 | X | — | — | ○ | ○ | ○ |
| Ex. ex. 5 | X | — | — | ○ | ○ | ○ |
| Ex. ex. 6 | X | — | — | ○ | ○ | ○ |
| Ex. ex. 7 | X | — | — | ○ | ○ | Δ |
| Ex. ex. 8 | X | — | — | ○ | ○ | ○ |
| Ex. ex. 9 | X | — | — | ○ | ○ | ○ |
| Ex. ex. 10 | X | — | — | ○ | ○ | ○ |
| Ex. ex. 11 | ○ | Δ | X | ○ | ○ | ○ |
| Ex. ex. 12 | Δ | X | — | ○ | ○ | ○ |

Ex. ex.: Experimental example

Table 3 shows the tested results at 120° C.

TABLE 3

(Test results at 120° C.)

| Experimental example | Prior examples (α = 48°) | | | Inventive examples (α = 10°, α = 35°) | | |
|---|---|---|---|---|---|---|
| | 100 hrs | 300 hrs | 500 hrs | 100 hrs | 300 hrs | 500 hrs |
| Ex. ex. 1 | X | — | — | ○ | ○ | ○ |
| Ex. ex. 2 | X | — | — | ○ | Δ | X |
| Ex. ex. 3 | X | — | — | ○ | ○ | ○ |
| Ex. ex. 4 | X | — | — | ○ | ○ | ○ |
| Ex. ex. 5 | X | — | — | ○ | ○ | ○ |
| Ex. ex. 6 | X | — | — | ○ | ○ | ○ |
| Ex. ex. 7 | X | — | — | ○ | Δ | X |
| Ex. ex. 8 | X | — | — | ○ | ○ | ○ |
| Ex. ex. 9 | X | — | — | ○ | ○ | ○ |
| Ex. ex. 10 | X | — | — | ○ | ○ | ○ |

TABLE 3-continued (Test results at 120° C.)

| Experimental | Prior examples ($\alpha = 48°$) | | | Inventive examples ($\alpha = 10°$, $\alpha = 35°$) | | |
|---|---|---|---|---|---|---|
| example | 100 hrs | 300 hrs | 500 hrs | 100 hrs | 300 hrs | 500 hrs |
| Ex. ex. 11 | ○ | X | — | ○ | ○ | ○ |
| Ex. ex. 12 | X | — | — | ○ | ○ | Δ |

Ex. ex.: Experimental example

In the conventional examples, except polyamide 46, the rotation torque was almost naught in the time within 100 hours, and the plastic sealing devices were scarcely usable (spaces occurred between the fitting groove and the plastic sealing device). Further, at 120° C., polyamide 46 (GF30) became impossible to use in the time within 500 hours.

The invention is useful to all plastics, but if the mixing amount of the glass fiber is 10 wt % or lower, there is probability of being not fully durable to use for a long period of time. This is assumed of influences by thermal expansion and elastic modulus at high temperatures. Therefore, as the plastic sealing devices to be used to the invention, it is preferable that the inorganic fibers are mixed 10 to 50 wt %. If mixing the inorganic fibers more than 50 wt %, a flowing of a thin plastic sealing device at injection-forming is bad, precision is poor and the resin might not go around. Further, for improving the forming precision (in portionicular, preventing warp), it is more preferable to mix portionicle reinforcing agents other than the inorganic fibers.

No limitation is made to resins, and if using resins mixed with inorganic fibers to polyamide 46 having excellent stress relaxing characteristics, durability (stabilization for a long period) is preferably superior.

The invention does not make any limitation to the above mentioned embodiments, and appropriate modifications or improvements are available.

In the embodiments, the sealed single-row deep groove ball bearing is exemplified, but no limitation is made thereto, and the invention may be applied to other embodied ball bearings.

In addition, the shape of the sealing lip is not limited to the embodied ones.

As explained above, depending on the sealed rolling bearing of the invention, it can well stands against high temperatures, prevent the mounting portion of the sealing device from the creep deformation, avoid the sealing plate from projecting outside from the sides of the inner ring and outer ring, and maintain the sealing efficiency for a long period.

What is claimed is:

1. A rolling bearing with a sealing device, comprising:
   an inner ring;
   an outer ring having a fitting groove that is formed into a concave shape portion and comprises an outside surface, an inside surface and a bottom face at a vicinity of an edge portion of said inner peripheral surface of said outer ring in an axial direction of said rolling bearing;
   wherein said fitting groove becomes narrower, in cross section, as going to an outside in a radius direction of said rolling bearing,
   said outside surface is formed at edge side of said inner peripheral surface of said outer ring and tilts at a tilt angle of 5 to 30 degrees with respect to the radial direction of said rolling bearing,
   said inside surface is formed opposite to said outside surface and tilts at a tilt angle with respect to the radial direction smaller than said tilt angle of said outside surface,
   said bottom face connects said outside surface and said inside surface, and
   a total of these tilt angles of said outside surface and said inside surface is 35 degrees or less;
   a plurality of rolling elements equidistantly arranged between said inner ring and said outer ring; and
   an annular sealing device arranged at a side of said rolling bearing and having a mounting portion that is fitted within said fitting groove and formed at an outer peripheral edge portion of said annular sealing device;
   wherein said mounting portion of said sealing device has a base portion contacting said inside surface of said fitting groove and a projecting portion protruding toward said outside surface of said fitting groove from said base portion,
   said projecting portion has the thinnest portion in a front end portion thereof.

2. The rolling bearing with the sealing device as set forth in claim 1,
   wherein said inner ring has a sealing groove formed as a concave shape in an axial direction,
   said sealing groove comprises a bottom face connecting a inside surface and a outside surface at vicinity of a edge portion of said inner peripheral surface of said outer ring, and said inside surface being opposite to said outside surface; and
   said sealing device has a lip portion formed on an inner peripheral edge portion of said sealing device and contacts two portions that are said inside surface of said sealing groove and a vicinity of a central portion of said outer peripheral surface of said inner ring more inside than said sealing groove, to thereby form a labyrinth.

3. The rolling bearing with the sealing device as set forth in claim 1,
   wherein said sealing device comprises engineering-plastic-simplex.

4. The rolling bearing with the sealing device as set forth in claim 2,
   wherein said sealing device comprises engineering-plastic-simplex.

5. The rolling bearing with the sealing device as set forth in claim 1,
   wherein said sealing device comprises of resin and inorganic fibers.

6. The rolling bearing with the sealing device as set forth in claim 2,
   wherein said sealing device comprises of resin and inorganic fibers.

7. The rolling bearing with the sealing device as set forth in claim 5,
   wherein said resin includes polyamide 46.

8. The rolling bearing with the sealing device as set forth in claim 6,
   wherein said resin includes polyamide 46.

9. The rolling bearing with the sealing device as set forth in claim 5,
   wherein said inorganic fibers include short fiber of glass fiber.

10. The rolling bearing with the sealing device as set forth in claim 6, wherein said inorganic fibers include short fiber of glass fiber.

11. The rolling bearing with the sealing device as set forth in claim 5, wherein said inorganic fibers include short fiber of carbon fiber.

12. The rolling bearing with the sealing device as set forth in claim 6, wherein said inorganic fibers include short fiber of carbon fiber.

13. The rolling bearing with the sealing device as set forth in claim 5, wherein said resin contains inorganic fibers, which are mixed 10 to 50 wt % in said resin.

14. The rolling bearing with the sealing device as set forth in claim 6, wherein said resin contains inorganic fibers, which are mixed 10 to 50 wt % in said resin.

* * * * *